United States Patent [19]

Ribbens et al.

[11] Patent Number: 5,239,473

[45] Date of Patent: * Aug. 24, 1993

[54] METHOD AND SYSTEM FOR DETECTING THE MISFIRE OF AN INTERNAL COMBUSTION ENGINE UTILIZING ANGULAR VELOCITY FLUCTUATIONS

[75] Inventors: William B. Ribbens, Ann Arbor, Mich.; Giorgio Rizzoni, Worthington, Ohio

[73] Assignee: Regents of the University of Michigan, Ann Arbor, Mich.

[*] Notice: The portion of the term of this patent subsequent to Apr. 6, 2010 has been disclaimed.

[21] Appl. No.: 741,338

[22] Filed: Aug. 21, 1991

Related U.S. Application Data

[63] Continuation-in-part of Ser. No. 512,779, Apr. 20, 1990.

[51] Int. Cl.$^5$ ............................................. G01L 3/00
[52] U.S. Cl. ............................ 364/431.08; 364/431.01; 364/550; 123/436; 324/379; 73/117.3
[58] Field of Search ............... 364/431.01, 431.03, 364/431.07, 431.08, 508, 511, 550, 551.01, 484, 572, 574; 123/416–419, 428, 436, 480; 324/379, 391, 392, 77 R; 73/116, 117.3

[56] References Cited

U.S. PATENT DOCUMENTS

| | | | |
|---|---|---|---|
| 3,789,816 | 2/1974 | Taplin et al. | 73/116 X |
| 4,083,234 | 4/1978 | Aono et al. | 73/116 |
| 4,197,767 | 4/1980 | Leung | 123/419 X |
| 4,292,670 | 9/1981 | Reid et al. | 364/431.04 |
| 4,344,140 | 8/1982 | Leung | 364/431.08 |
| 4,347,571 | 8/1982 | Leung et al. | 364/431.08 |
| 4,357,662 | 11/1982 | Schira et al. | 364/431.08 |
| 4,424,709 | 1/1984 | Meier, Jr. et al. | 73/117.3 |
| 4,532,592 | 7/1985 | Citron et al. | 364/431.07 X |
| 4,539,841 | 9/1985 | Schroeder et al. | 73/116 |
| 4,550,595 | 11/1985 | Venema | 73/116 |
| 4,562,818 | 1/1986 | Kohama et al. | 364/431.08 |
| 4,691,288 | 9/1987 | Kay et al. | 73/116 X |
| 4,697,561 | 10/1987 | Citron | 364/431.07 X |
| 4,800,500 | 1/1989 | Tanaka | 364/431.08 |
| 4,843,870 | 7/1989 | Citron et al. | 73/116 |
| 4,987,770 | 1/1991 | Nanyoshi et al. | 73/115 |

Primary Examiner—Jack B. Harvey
Assistant Examiner—E. J. Pipala
Attorney, Agent, or Firm—Brooks & Kushman

[57] ABSTRACT

A hybrid method and system are disclosed for the detection of internal combustion engine misfires. The method and system are capable of detecting misfires even at very low occurrence rates in real time with inexpensive analog and digital (i.e. hybrid) electronics suitable for use on-board a vehicle, thus satisfying current and proposed exhaust emission control regulations. The method and system exploit a measurement of engine crankshaft angular velocity in conjunction with hybrid electronic signal processing. Once the angular velocity signal is conditioned to minimize the effects of random error and external disturbances, four alternate computationally efficient methods may be used to extract information pertaining to individual cylinder torque productions. Two of the methods employ extremal samples of the estimated torque or velocity waveform to obtain a random torque nonuniformity index or metric. The other two methods utilize a transformation into the frequency domain after the input data is first sampled and windowed to substantially lower probability of error. All of the methods provide an M-dimensional torque non-uniformity vector of individual cylinder performance for each individual engine cycle. The non-uniformity vector represents a compact and efficient measurement to which statistical decision theory is applied.

14 Claims, 6 Drawing Sheets

METHOD AND SYSTEM FOR DETECTING THE MISFIRE OF AN INTERNAL COMBUSTION ENGINE UTILIZING ANGULAR VELOCITY FLUCTUATIONS

CROSS-REFERENCE TO RELATED APPLICATION

This application is a continuation-in-part application of a co-pending patent application having the same title with Ser. No. 512,779, filed Apr. 20, 1990. The co-pending application is hereby expressly incorporated by reference.

TECHNICAL FIELD

This invention relates to methods and systems for detecting the misfire of an internal combustion engine and, in particular, to method and system for detecting the misfire of an internal combustion engine utilizing angular velocity fluctuations of the engine.

BACKGROUND ART

In recent years, automotive exhaust emission control system performance has become an important issue across the U.S. Virtually all cars sold in the U.S. from the early 1980's have been equipped with a three-way catalytic converter in the exhaust system. In order for this catalytic converter to function correctly, the vehicle is also typically equipped with a fuel control system which maintains a stoichiometric mixture (i.e. Air mass/fuel mass=14.7).

The long-term performance of automotive exhaust emission control systems is strongly influenced by the physical condition of the catalytic converter. Unfortunately, the catalytic converter is susceptible to irreversible damage from any number of factors.

One of the most likely causes of catalyst degradation is the occurrence of engine misfire. Misfire is a condition in which combustion does not occur in one or more engine cycles in one or more cylinders due, for example, to absence of ignition, or misfueling. Under engine misfire conditions, unburned fuel and air are pumped into the catalyst, greatly increasing its operating temperature. This problem is usually most severe under high load, high speed engine operating conditions, where even a few seconds of misfire can cause catalyst temperatures to soar above 900° C. (650° F.), causing irreversible damage to the catalyst. Even today's most advanced catalysts generally are unable to sustain continuous operation above 900° C. without damage.

Vehicle operation while misfire is present also contributes to excess emissions, especially when the misfire is present during engine warmup and the catalyst has not reached operating temperature. Obviously, misfire is also undesirable because the engine produces reduced or no torque during the misfiring cycle.

The integrity of the exhaust emission system can best be maintained by monitoring its performance continuously on board the vehicle. It is with the intent of monitoring emission system performance that the California Air Resources Board in 1989 passed regulations which will require all new vehicles after 1994 to be equipped with on-board monitoring systems capable of detecting misfires. These proposed regulations are known as OBDII and may be followed by similar Federal EPA regulations. The proposed regulations are applicable for any misfire condition (e.g. random, continuous, equally spaced, etc.) for the purpose of identifying a malfunction.

There are a variety of methods and systems for detecting misfire. These include the use of crankshaft angular velocity fluctuation, observing the change in oxygen sensor waveform pattern, enhancing the present knock sensor concept to "listen" for the absence of combustion, installation of cylinder pressure transducers, analysis of secondary ignition waveform pattern, use of temperature sensors to detect catalyst temperature during misfire, and others.

The prior art discloses many methods of detecting misfire based upon measurements of torque as derived from noncontacting crankshaft angular velocity measurements. The misfire condition is detected from these torque measurements. These methods of torque measurement are well known. However, each of these methods has certain deficiencies with respect to cost effective, reliable misfire detection as required y the OBDII regulations.

For example, each of U.S. Pat. Nos. 4,843,870, 4,697,561 and 4,532,592 disclose a method of measuring engine torque utilizing digital techniques to sample crankshaft angular velocity. The time between successive fixed angular positions on the crankshaft is measured using a high frequency clock. One sample of crankshaft angular velocity $\omega_i$ is obtained by the relation:

$$\omega_i = \frac{\theta_i - \theta_{i-1}}{\Delta t_i}$$

where
$\theta_i$ and $\theta_{i-1}$ are the crankshaft angular positions.
$\Delta t_i$ = time interval.

One of the problems of this digital measurement of angular velocity is the random (or pseudorandom) errors involved. There are two error sources for the digital method: 1) the random variations in measurement of angular position and 2) the timing errors involved in measuring $\Delta t_i$. The first error source results from runout of the crankshaft gear and by variations in the magnetic coupling of the sensor to the crankshaft gear. In order to be practical for torque measurements, these angular velocity measurements must be filtered by means of a digital filter.

Thus the digital measurement of crankshaft angular velocity has the disadvantage of requiring electronic complexity simply to obtain a measurement (with minimum random error) of crankshaft angular velocity. In addition, this digital method has a limited sampling rate which is influenced by the angular separation $\Delta\theta(\Delta\theta = \theta_i - \theta_{i-1})$. The clock frequency must be extremely high to have an adequate number of counts to achieve the desired sampling rate and achieve the accuracy required to measure $\Delta\theta$. The accuracy of determining $\theta_i$ and $\Delta t_i$ decreases with increasing RPM.

Another deficiency in the digital method is the rather cumbersome method of dealing with engine dynamics. It has long been recognized that calculation of torque from crankshaft angular velocity measurements requires a correction for the forces associated with reciprocating components (i.e. piston, connecting rod). This is illustrated in the reference A. Rizzoni, "A Model for the Dynamics of the Internal Combustion Engine", PhD dissertation, Department of Electrical and Computer Engineering, University of Michigan, Ann Arbor, Mich., February 1986.

Still another deficiency in the references pertaining to torque nonuniformity measurements relative to misfire detection is the lack of any recognition that an index of torque nonuniformity is a random variable. There is no mention of the random nature of engine combustion, leading to randomness in engine torque production, in the prior art references except for those published by the present inventors.

For example, U.S. Pat. No. 4,550,595 discloses an analog circuit-based method of continuously estimating the instantaneous indicated torque of a four cylinder, two stroke/cycle reciprocating internal combustion engine. This patent teaches a method of calculating this torque based upon noncontacting continuous time measurements of crankshaft angular velocity. An exact calculation which accounts for the influence of the inertial forces associated with the reciprocating components on the crankshaft angular dynamics is also taught. There is no suggestion of using the measured torque for any cylinder by cylinder performance measurement and there is no hint of misfire monitoring.

U.S. Pat. No. 3,789,816 discloses a closed loop fuel control system for gasoline fueled reciprocating internal combustion engines. The control system incorporates instrumentation for measuring "engine roughness" (i.e. cylinder to cylinder and cycle to cycle torque imbalance). The roughness signal is obtained by electronic signal processing of crankshaft angular velocity measurements. The electronic signal processing does not account for reciprocating inertia forces.

U.S. Pat. No. 4,292,670 discloses a method for measuring the power and/or compression balance for a diesel engine. The method uses a noncontacting sensor to obtain a signal from the starter ring gear. Using a digital method, estimates are obtained of crankshaft angular velocity with a very limited sampling rate. The angular velocity measurements are then used as a means of estimating the work done by the engine during power stroke without compensating for reciprocating inertial forces in the engine dynamics.

U.S. Pat. No. 4,197,767 discloses a method of fuel control for a gasoline fueled IC engine during warm-up period. A method of measuring "engine roughness" is provided. This method incorporates a noncontacting sensor for measuring crankshaft angular velocity. Electronic signal processing generates a signal which is indicative of engine roughness. However, there is no teaching of reciprocating inertia compensation. Furthermore, there is no hint of any relationship between the engine roughness signal and actual engine misfire.

SUMMARY OF THE INVENTION

An object of the present invention is to provide an improved method and system for detecting relatively low occurrence rates of engine misfires in real time in a reliable and cost effective fashion.

Another object of the present invention is to provide an improved method and system for detecting low occurrence rates of engine misfire in real time without requiring that a number of consecutive misfires occur in the same cylinder.

Still another object of the present invention is to provide an improved method and system for detecting relatively low levels of engine misfire in real time wherein single misfire events may be spaced randomly among mostly firing cycles.

In carrying out the above objects and other objects of the present invention, a method is provided for detecting the misfire of a reciprocating internal combustion engine having a plurality of reciprocating components, at least one cylinder and a crankshaft. The method includes the steps of measuring the angular velocity of the crankshaft to obtain an electrical signal representation thereof and filtering the electrical signal to minimize the effects of random error and disturbances in the electrical signal to obtain a filtered angular velocity signal. A waveform associated with the filtered angular velocity signal is then sampled synchronously with crankshaft angular position at a sampling rate to obtain sampled data. The sampled data is then windowed to obtain a windowed data prior to performing a frequency domain transformation as part of the step of calculating an M-dimensional nonuniformity vector derived from the windowed data. (M is normally proportional to the number of cylinders of the engine). Then an index of torque nonuniformity is computed based on the M-dimensional vector. The index of torque nonuniformity represents the variation in torque from cylinder to cylinder and from cycle to cycle. Finally, a statistical decision algorithm is applied to one or the other of the index of torque nonuniformity and the torque nonuniformity vector. The algorithm statistically distinguishes between a true misfire and normal cyclic variability which characterizes the combustion process in each cylinder of the engine, to thereby obtain a misfire signal.

Misfire can also be detected by statistical pattern recognition methods applied to the torque nonuniformity vector, obtained either by time or frequency domain method, without computing the index of torque nonuniformity.

Further, the algorithm can compute the thresholds required to satisfy the misfire criteria specified by regulatory agencies, and the associated probabilities of false alarm and missed detection. The preferred embodiment of the present invention in particular is configured for optimal application of statistical decision theory for reliably detecting misfire even at the lowest occurrence rates.

Also provided is a system for carrying out each of the method steps.

Four possible embodiments are provided for carrying out the calculating step.

The objects, features and advantages of the present invention are readily apparent from the following detailed description of the best mode for carrying out the invention when taken in connection with the accompanying drawings.

BRIEF DESCRIPTION OF THE BEST MODE

Figure 1:
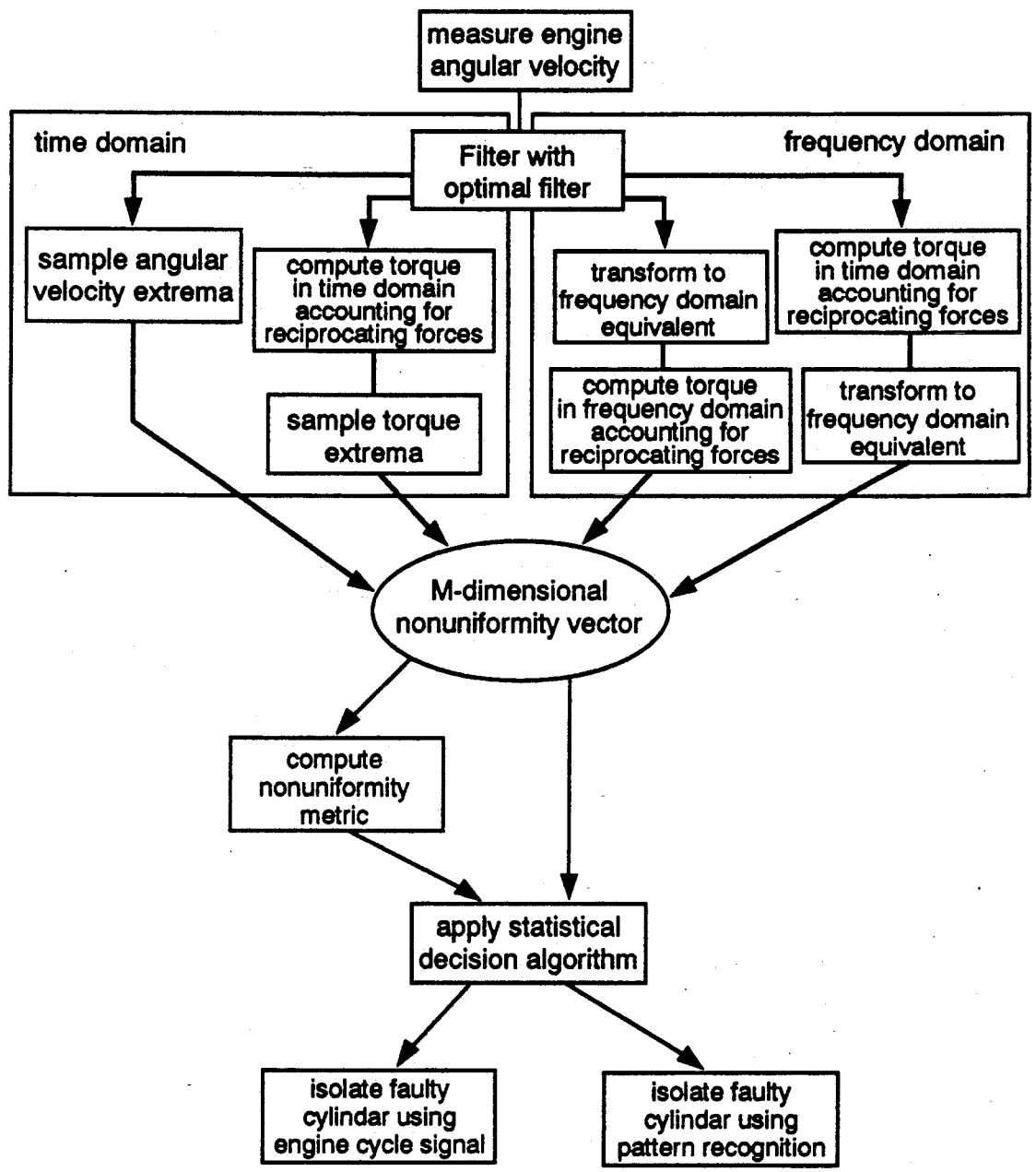
FIG. 1 is a block diagram of the method of the present invention.
Figure 2:
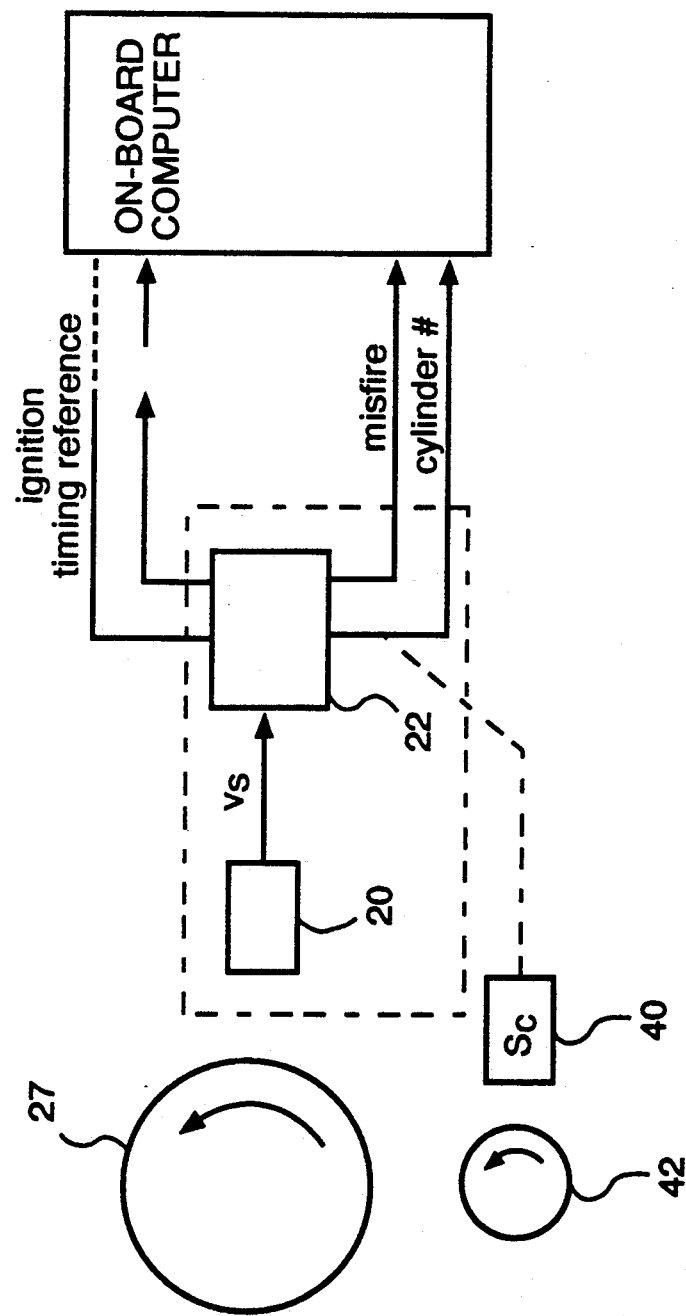
FIG. 2 is a block diagram of the system of the present invention.

Referring now to the drawing figures, there is illustrated in FIGS. 1 and 2 the method and system for detecting the misfire of a reciprocating IC engine utilizing angular velocity fluctuations. As indicated in FIG. 1, four possible methods are provided for such detection.

Figure 3:
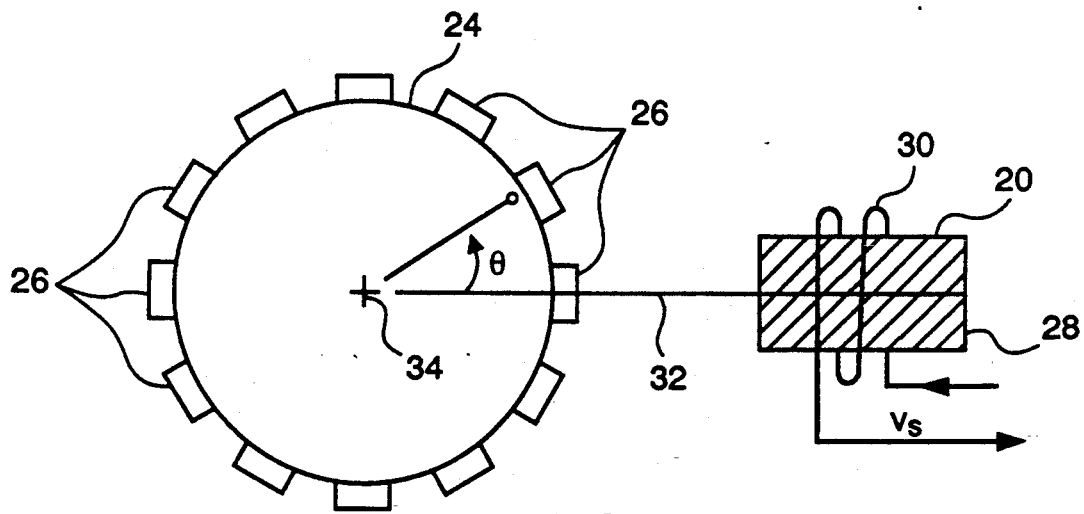
FIG. 3 is a schematic diagram of a crankshaft position sensor for use in the present invention.

FIGS. 2 and 3 illustrate a crankshaft position sensor, generally indicated at 20, which generates an output signal, $V_S$, which is the primary input to an electronic signal processing unit, generally indicated at 22. A variety of sensor configurations are potentially possible including magnetic induction, Hall effect, optical, etc.

In the embodiment of FIG. 3, a ferromagnetic disk, generally indicated at 24, with M uniformly spaced lugs 26 is coupled magnetically to the sensor 20. The disk 24 is mounted for rotation with a crankshaft 27 of an internal combustion engine.

In this embodiment of the sensor 20, the sensor 20 includes a permanent magnet 28 around which a coil 30 is wound. The magnetic flux linkage varies periodically with crankshaft angle $\theta$ because the magnetic coupling varies with spacing between the sensor 20 and the disk 24. This spacing is smallest whenever any lug 26 is symmetrically positioned along the center line ($C_L$) 32 of the crankshaft axis 34 and coil axis as shown. The magnetic flux linkage for the coil 30 is smallest whenever any pair of lugs 26 are symmetrically positioned relative to the center line 32. The angular period of the periodic flux linkage is $$\frac{2\pi}{M}$$

radians (or 360°/M degrees) where M is the number of lugs 26 on the disk 24.

As the crankshaft 27 rotates about its axis 34, the sensor 20 generates an output voltage $v_S(t)$ in accordance with Faraday's law. The instantaneous frequency of the sensor voltage, $\omega_S(t)$ is related to the instantaneous crankshaft angular frequency $\omega_c(t)$ by:

$\omega_S(t) = M\omega_c(t)$ (ideal model)

$\omega_S(t) = M\omega_c(t) + y(t)$ (practical model)

The practical model contains a term y(t) which is a pseudo-random process associated with imperfections in the uniformity of the coupling of the sensor to the lugs 26 on the disk 24.

There are two distinct methods of obtaining the measurement of crankshaft angular velocity from the sensor output: 1) analog, and 2) digital. In one digital method, the time interval between successive zero crossings at the sensor voltage $\tau_i$ is measured. For each such measurement, an estimate $f_i$ of angular speed is obtained.

$\omega_i = \frac{2\pi}{\tau_i}$ ideal relationship $\omega_i = \frac{2\pi + \delta\theta_i}{\tau_i + \delta\tau_i}$ practical model In the practical model, errors $\delta\theta_i$ and $\delta\tau_i$ occur due respectively to:

$\delta\theta_i$ = errors due to runout and imperfections in uniformity of lug spacing $\delta\tau_i$ = time interval errors In the digital method, there are three error sources in each estimate of $\omega_i$. The timing errors associated with measuring $\tau_i$, the errors in $\delta\theta_i$ due to imperfections in tooth to tooth spacing and/or magnetic coupling and the errors in $\delta\theta_i$ due to runout can be reduced by digital filtering of $\omega_i$. However, the runout error generates an error signal the spectrum of which overlaps the spectrum of the engine angular velocity signal during misfires and, in general, cannot be separated from measurements of $\omega_i$.

Figure 4:
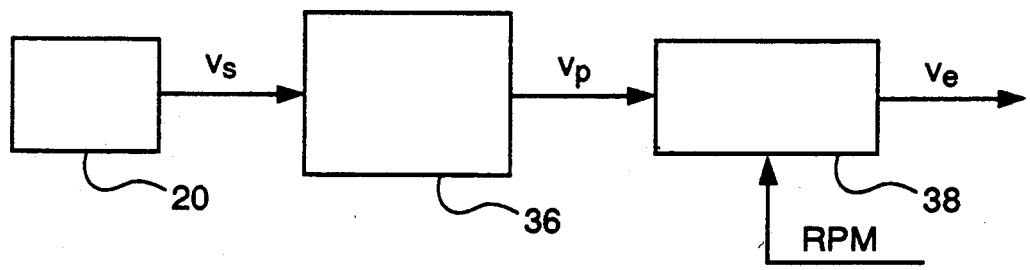
FIG. 4 is a block diagram of a part of the system for obtaining an analog voltage which is proportional to the angular velocity of the crankshaft.
Figure 5A:
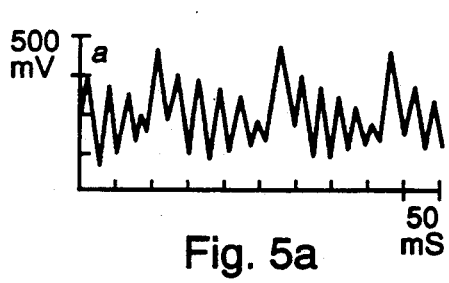
FIGS. 5A through 5D are graphs illustrating angular velocity waveforms associated with various types of misfire conditions.
Figure 5B:
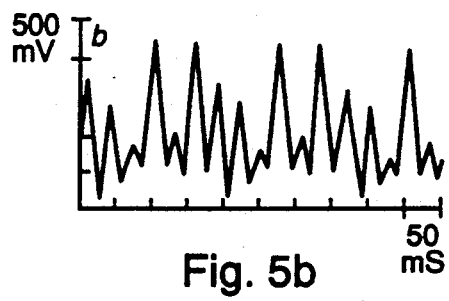
Figure 5C:
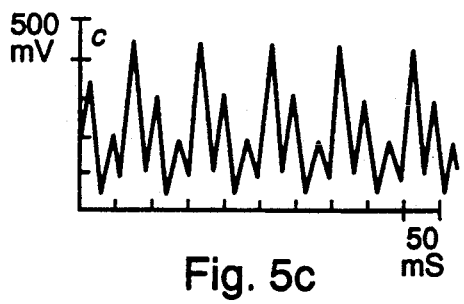
Figure 5D:
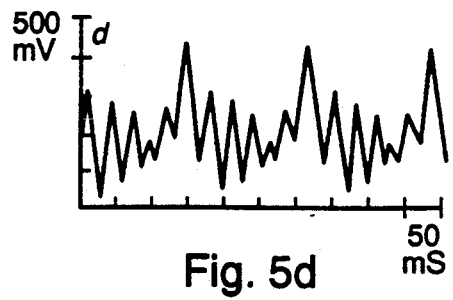

The analog method of the present invention is preferred and is illustrated in FIG. 4. The method uses an analog frequency to analog converter 36 along with a variable band pass filter 38 to obtain an analog voltage which is proportional to $\omega_i$.

The variable filter 38 is a band pass filter whose pass band frequencies are adjusted in accordance with crankshaft average angular speed (i.e. RPM), so that the filter selectively remains constant with varying engine speed. This engine speed-dependent filtering is important to the effectiveness of the misfire detection method of the present invention, as it effectively provides a signal to noise ratio which is constant at all engine speeds, and an effective signal bandwidth which is constant at all engine speeds. One of the common drawbacks of other proposed methods is the inability to perform accurate detections at high speeds. The method discussed here does not suffer such limitations, because as engine speed is increased, little additional noise is introduced even though it is recognized that at high engine speeds camshaft and accessory loading add complexity to the dynamic motion of the crankshaft. However, one of the strengths of the frequency domain approach taught herein with respect to two embodiments of the present invention is the ability to separate the frequency domain component of crankshaft speed at the firing frequency (which is due to the combustion event) from such interference events as those described above, thereby facilitating the detection of misfires at all engine speeds.

The same is also accomplished in the time domain approach, also taught herein. Due to the optimal filtering algorithm, which eliminates the higher harmonics of the angular speed signal uniformly at all engine speeds, and owing to the fact that the misfire process generates energy only at subharmonics of the engine firing frequency, the time domain approach also achieves good detection of misfires in the presence of additional vibrations induced by such factors as camshaft loading or driveline road-induced excitation.

Another advantage of the present invention is the ability to distinguish individual misfiring cylinder(s). This is accomplished by means of a so-called engine cycle signal. This signal is generated once for each engine cycle (i.e. once for each two revolutions for a four-stroke/cycle engine and once per revolution for a two-stroke/cycle engine). Typically, such a signal is generated by a sensor 40 which is activated by a specific point on the engine camshaft 42, as illustrated in FIG. 2. For example, a magnetic sensor can be positioned close to a lug on the camshaft. A voltage pulse is generated each time this lug rotates past the sensor axis.

Overview

The successful implementation of the misfire detection method of three of the embodiments of the present invention requires algorithms which are capable of estimating the relative torque produced by each engine cylinder from the measured engine angular velocity; the fourth embodiment uses the angular velocity waveform directly. Two of the embodiments consist of sampling the extrema of either the angular velocity or of the engine torque waveform to obtain an M-dimensional nonuniformity vector, and are implemented in the time domain; the remaining two embodiments require converting either the angular velocity waveform or the engine torque waveform into the frequency domain by means of a frequency domain transformation, to obtain an M-dimensional nonuniformity vector. The following sections describe the principles underlying both the time domain and the frequency domain method. An M-dimensional vector of engine torque nonuniformity can be obtained by any of the above mentioned embodiments, permitting the identification of engine misfires on a cylinder-by-cylinder and cycle-by-cycle basis.

Method 1: Time Domain

This section describes the preferred algorithm for the computation of an M-dimensional nonuniformity vector, consisting of either the extrema of the engine torque or the extrema of the engine angular velocity waveform, based on the measurement of crankshaft angular velocity. Experiments have demonstrated that the extrema of the engine torque waveform permit in general better identification of engine misfires; thus, the discussion will focus on the computation of the extrema of the torque waveform. In some circumstances, however, the extrema of the angular velocity waveform can also be effectively employed for misfire detection.

As illustrated in the reference G. Rizzoni, "A Model For The Dynamics Of The Internal Combustion Engine," Ph.D. dissertation, Department of Electrical and Computer Engineering, University of Michigan, Ann Arbor, February 1986, in order to compute the torque waveform from the angular velocity waveform, one needs to account for the dynamics of the engine rotating assembly, and for the effects of the reciprocating motion of the piston/connecting rod assembly. The principle underlying the method for reconstructing engine torque from angular velocity is based on the notion that the torque accelerating the crankshaft, and therefore causing the measured fluctuations in the angular velocity, is due to the superposition of two effects: i) combustion generated forces; and ii) reciprocating forces. Thus, the net engine torque accelerating the crankshaft 27, $T_e(\theta)$ may be expressed as a function of the crank angle, $\theta$, as follows:

$$T_e(\theta) = T_i(\theta) + T_r(\theta)$$

where $T_i(\theta)$ is the indicated torque, generated by the combustion forces, and $T_r(\theta)$ is the reciprocating inertia torque, generated by the reciprocating forces. The net engine torque, $T_e(\theta)$, accelerates the crankshaft 27, causing oscillations in the instantaneous engine angular velocity, $\omega(\theta)$; thus, the angular velocity waveform is itself composed of three components: the first consists of the velocity fluctuations which occur as a consequence of the combustion process, the second is due to the unavoidable reciprocating inertia torque due to the geometry of the crank-slider mechanism, which couples the combustion produced forces to the crankshaft; the third is due to the superposition of any other forces exciting an oscillation of the crankshaft 27 about its axis 34, including resonances, road-induced vibration, and accessory loads. The net effect of all these components is viewed as consisting of essentially random noise. The following expression illustrates the subdivision:

$$\omega(\theta) = \omega_i(\theta) + \omega_r(\theta) + \epsilon_w(\theta)$$

As noted in the above-noted reference in the name of G. Rizzoni, an estimate of the engine indicated torque, $T_i(\theta)$, may be obtained from a measurement of engine angular velocity, $\omega(\theta)$, by first considering the dynamics of the rotating assembly, consisting of the crankshaft, flywheel, harmonic damper, transmission and driveline, herein indicated by the impulse response of the rotating assembly, $h(\theta)$, is given by the convolution of the net engine torque, $T_e(\theta)$, with the impulse response of the engine rotating assembly:

$$\omega(\theta) = T_e(\theta) * h(\theta)$$

The above-noted reference teaches how to invert the above relationship in order to obtain $T_e(\theta)$ from a measurement of $\omega(\theta)$. Once the engine torque, $T_e(\theta)$ is known, the indicated torque, produced by the combustion forces, may be obtained by subtracting $T_r(\theta)$ from $T_e(\theta)$:

$$T_i(\theta) = T_e(\theta) - T_r(\theta)$$

The reciprocating inertia torque correction term amounts to the product of a known function of crank angle, $f(\theta)$, times the equivalent mass of the reciprocating parts, times the square of the average engine speed. The function $f(\theta)$ is determined by the geometry of the reciprocating assembly, and can be precomputed for any given engine class. An approximate expression for the reciprocating inertia torque is given by the equation below for a four cylinder in-line engine configuration; corresponding expression may be obtained for six and eight cylinder engines in various configurations. The approximation below is adequate for estimating the indicated torque using the expression given above:

$$T_r(\theta) = M_{eq}\omega^2 R^2 \left(\cos\theta + \frac{R}{2L}\cos 2\theta\right)\left(\sin\theta + \frac{R}{2L}\sin 2\theta\right)$$
$$= \omega^2 f(\theta)$$

where R is the crank throw, $\omega$ the average engine RPM, L the connecting rod length, $\theta$ the crank angle, and $M_{eq}$ the equivalent mass of the reciprocating parts. The values of the function $f(\theta)$ may be pre-computed and stored in a table for use by the processor in computing the reciprocating inertia torque at any given engine speed.

The estimate of indicated torque obtained by the procedure outline above forms the basis of the misfire detection method disclosed herein. Since $T_i(\theta)$ is directly related to the combustion forces, knowledge of the instantaneous $T_i(\theta)$ waveform permits a determination of whether a normal or abnormal combustion occurred, and therefore the detection of engine misfire. It must however be remarked that due to the presence of a random component $\epsilon_w(\theta)$ in the measured speed waveform, the estimate of indicated torque is computed by random error. One aim of the present invention is to minimize the effects of such random error by employing statistical decision theory, as shown in a later section.

Figure 6:
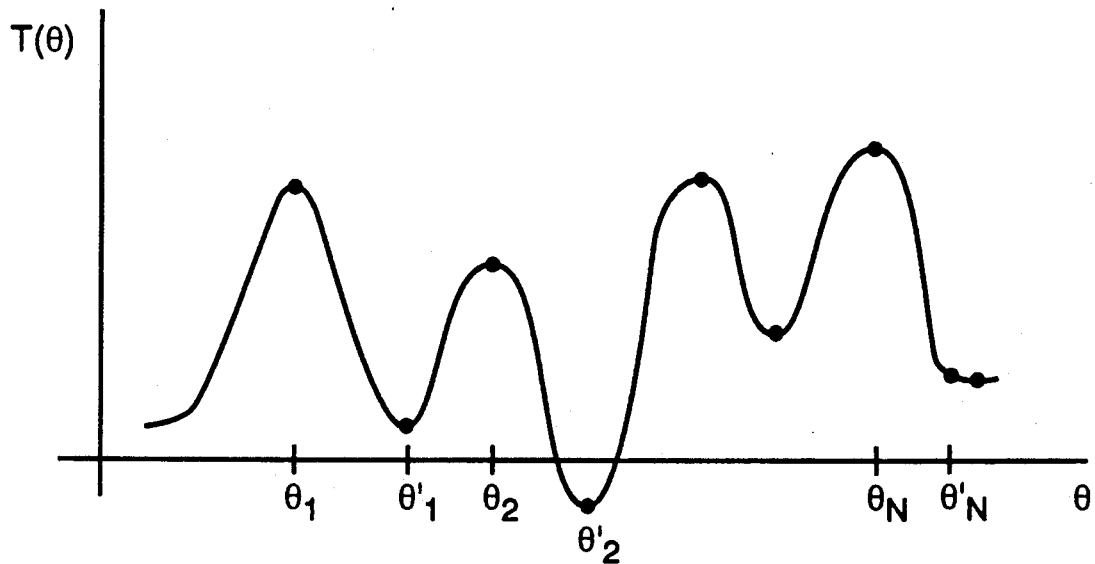
FIG. 6 is a graph of a torque waveform with samples of its extreme values.
Figure 7:
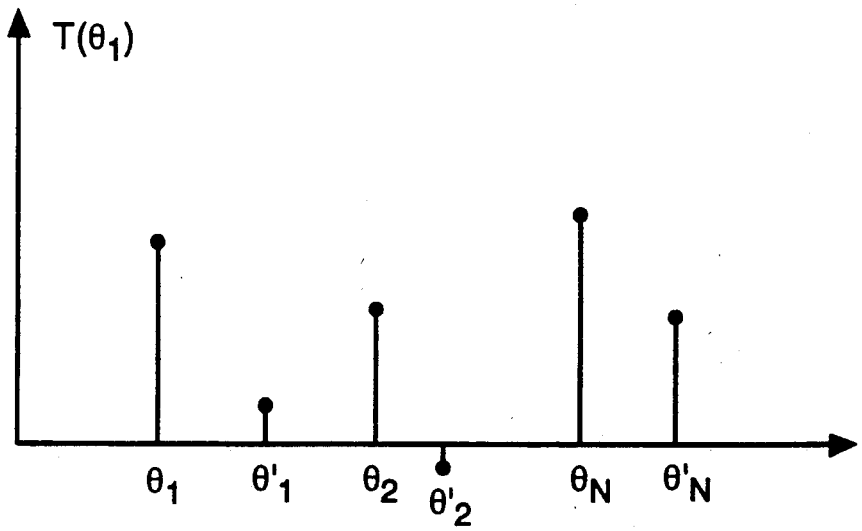
FIG. 7 is a graph of typical torque vector data.

The torque nonuniformity measurement is derived from samples of the extremal values of the torque waveform as illustrated in FIG. 6. Whereas, FIG. 7 illustrates typical torque vector data.

In FIG. 6, the torque $T_i(\theta)$ is represented as a function of crankshaft angle $\theta$. Each cycle represents the torque generated by a particular cylinder. By sampling $T_i(\theta)$ at the extremal values, the essential features of the nonuniformity are maintained. This is true because the shape of the torque waveforms between combustion events is determined by the combustion pressure as a function of crank angle and by the crankslider geometry of the engine. The crankshaft angles and associated torques at the extremal values are denoted:

$\theta_n$=crankshaft angle for relative maximum associated with cylinder n $\theta^n$=crankshaft angle for relative minimum associated with cylinder n $T_n = T_i(\theta_n)$ $T^n = T_i(\theta^n) \quad n = 1, 2, \ldots N$ These values are obtained for each engine cycle and an M-dimensional vector is computed, where $M=2N$ in the preferred embodiment and where the superscript $T$ denotes the transpose of the vector.

$T^T = [T_1, T^1, \ldots T_n, T^n]$.

The average value for the 2N components $T_{av}$ is then found.

$T_{av} = \frac{1}{2N} \sum_{n=1}^{N} (T_n + T^n)$

The a 2N-dimensional vector representing torque nonuniformity is computed.

$n = T - T_{av}u$.

where $u^T = [1, -1, 1, -1, \ldots]$ is a 2N dimensional vector.

An M-dimensional vector of torque extrema (wherein M equals 2N in this embodiment and N represents the number of cylinders), $n = T - T_{av}u$ may be used to isolate the cylinder(s) responsible for the misfiring condition very effectively, as will be explained shortly.

Method 2: Frequency Domain

This section describes the preferred algorithm for the computation of a M-dimensional nonuniformity vector, consisting of the spectral content of the relative indicated torque produced by each cylinder during each cycle. Two embodiments are possible, according to the flow diagram of FIG. 1: the first transforms the time domain indicated torque waveform, computed as illustrated in the preceding section, into a frequency domain equivalent using a frequency domain transformation. The second embodiment directly applies a frequency domain transformation to the measured angular velocity waveform, and the computes the indicated torque produced by each cylinder in the frequency domain, as will be explained shortly. The result of either method is an M-dimensional torque non-uniformity vector which can be employed in a statistical decision algorithm for misfire detection. The frequency domain method may be even more effective in recovering the individual cylinder torque information, leading to the detection of misfires.

Let $\lambda$ represent angular frequency (which is canonically conjugate to crank angle) and let f represent a crank angle to angular frequency domain transformation, such as for example the Discrete Fourier Transform (DFT) performed on a number of samples of the analog velocity waveforms. The notation which shall be employed is the following:

$f\{\omega(\theta_n)\} = \Omega(\lambda)$ where $\omega(\theta_n)$ is a sampled version of the analog angular velocity waveform, sample at $\theta = \theta_n$.

As illustrated in the above-noted reference by G. Rizzoni, the relationship expressed earlier between engine torque and engine angular velocity, and repeated below for convenience $\omega(\theta) = T_e(\theta) * h(\theta)$ can also be expressed in the frequency domain, by the well known convolution property of linear systems, according to the expression:

$\Omega(\nu) = T_e(\lambda)H(\lambda)$ where $H(\lambda)$ is the frequency response of the engine rotating dynamics, and can be measured experimentally for a given engine class. Based on this relationship, the frequency domain engine torque $T_e(\lambda)$ can be computed by the expression $T_e(\lambda) = \Omega(\lambda)H^{-1}(\lambda)$.

The frequency domain indicated torque can therefore be computed according to the expression $T_i(\lambda) = T_e(\lambda) - T_r(\lambda)$ where $T_r(\lambda)$ is obtained by a frequency domain transformation of the time domain reciprocating inertia torque $T_r(\theta)$:

$T_r(\lambda) = f(T_r(\theta))$.

The spectra of $\omega(\theta)$ and of $T_i(\theta)$, $\neq(\lambda)$ and $T_i(\lambda)$, respectively, can be computed exactly by means of a frequency domain transformation (e.g., a DFT) because of the periodic nature of the rotation of the engine and of the combustion forces as a function of crank angle, $\theta$. Furthermore, as illustrated in the above-noted reference by G. Rizzoni, most of the energy in the combustion process is concentrated at the engine firing frequency, hereafter denoted by $\lambda_f$. Therefore, the computation of the indicated torque for each cylinder is greatly simplified in the frequency domain if performed at the single frequency $\lambda_f$.

$$T_i(\lambda_f) = T_e(\lambda_f) - T_r(\lambda_f)$$
$$= \Omega(\lambda_f)H^{-1}(\lambda_f) - T_r(\lambda_f)$$

Thus the recovery of the indicated torque produced by each cylinder at the firing frequency can be accomplished by computing a frequency domain transformation (e.g., a DFT) of the angular velocity waveform sampled at discrete crank angles, $\theta_n$, where the sampling occurs synchronously with crank angle position, where the frequency domain transformation is computed only at the frequency $\lambda_f$, followed by multiplication by the inverse of the frequency response of the engine rotating assembly evaluated at $\lambda_f$, and by a correction for the frequency domain reciprocating inertia torque, also evaluated at $\lambda_f$. It is a distinct advantage of this method to only require the computation of a single frequency component of $\omega(\theta)$, and the storage in a table of a single frequency component of $T_r(\theta)$. In this case, $M=N$, where N is the number of cylinders. It is, however, possible to accomplish the same end by considering a plurality of frequency components, consisting of harmonics and subharmonics of the engine firing frequency, $\lambda_f$, if so desired. In this latter case, M is an integer multiple of N, determined by the number of frequency components employed in representing the indicated torque for each cylinder.

A further embodiment of the present method consists of transforming the indicated torque computed according to the time domain method described in the preceding section, and described by the expression $$T_i(\theta)=T_e(\theta)-T_r(\theta)$$

into a frequency domain equivalent, $T_i(\lambda)$, by means of a frequency domain transformation, after having sampled the indicated torque waveform $T_i(\theta)$ at discrete crank angle intervals, $\theta_n$, to obtain a discrete indicated torque sequence $T_i(\theta_n)$. The resulting frequency domain indicated torque, $T_i(\nu)$, also gives rise to an M-dimensional vector of torque nonuniformity as described above.

The values of indicated torque computed by each of the above embodiments for each engine cylinder form an M-dimensional vector of torque nonuniformity, which can be used in a statistical decision algorithm for detecting engine misfire, as explained in the next section.

Figure 9:
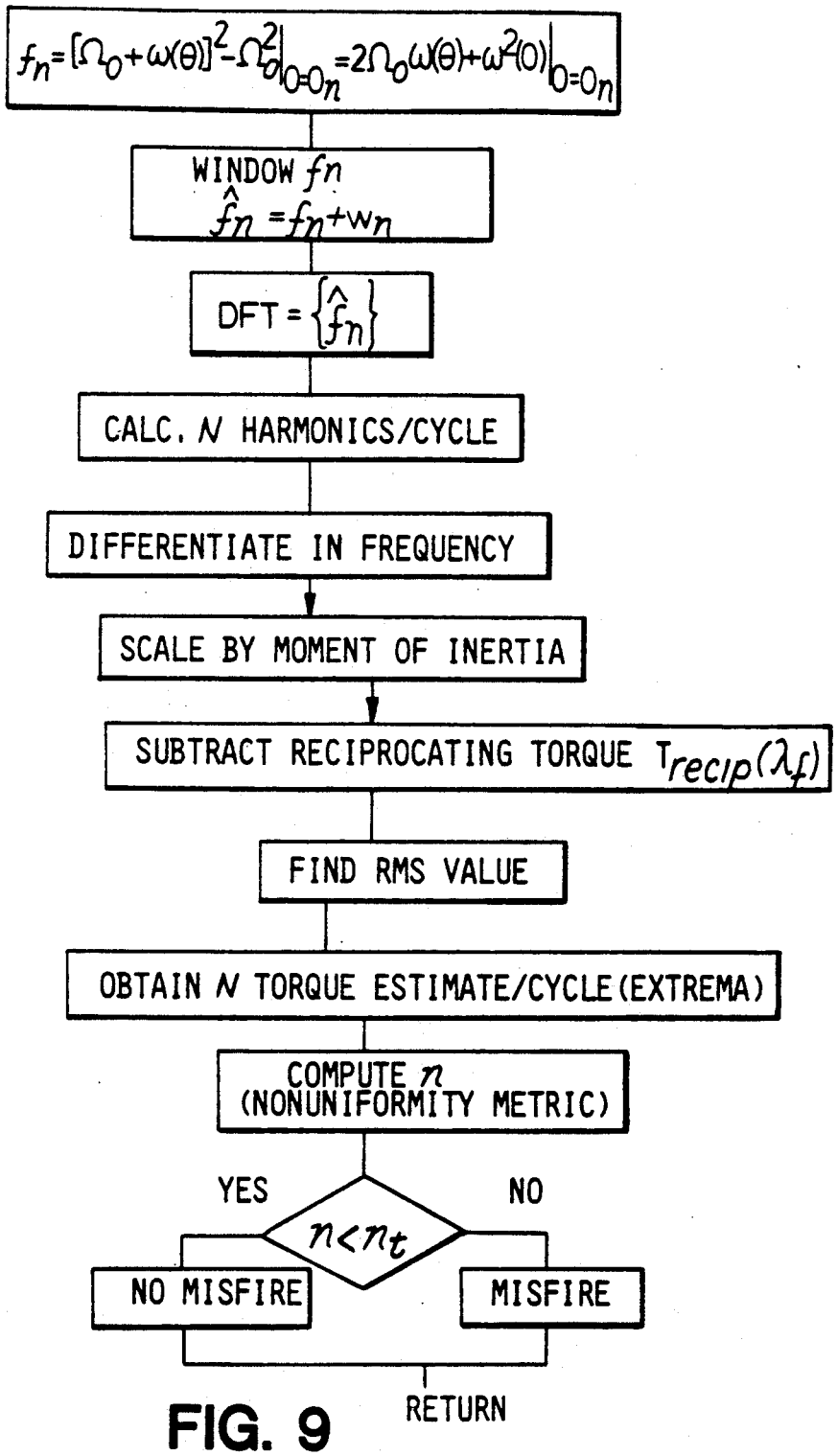
FIG. 9 is a block diagram flow chart of the improved method of the present invention.

An improvement in the misfire detection method and apparatus described in the present section is illustrated in FIG. 9 and as follows. In the previously described method, the instantaneous indicated torque is estimated in the frequency domain based upon measurements of the sampled crankshaft instantaneous angular velocity, $$\omega(\theta_n)=\omega+f_{sc}(\theta_n)$$

where $\omega$ is the average angular velocity (RPM) and $\omega_{sc}(\theta_n)$ is the deviation from $\omega$ of the instantaneous angular velocity due to the cylinder firing events. As illustrated above, the frequency domain method involves calculating a frequency domain transformation of the engine angular velocity signal, for example:

$$\Omega(\lambda)=F\{f+\omega_{ac}(\theta_n)\}=DFT\{\omega+\omega_{ac}(\theta_n)\} \text{ at } \lambda=\lambda_f$$

In the present invention, the angular speed is modified as follows:

$$\omega'(\theta_n)=\{[\omega+\omega_{sc}(\theta_n)]^2\omega^2=2\omega\omega_{sc}(\theta_n)=\omega_{sc}^2(\theta_n)$$

then a window $w(\theta_n)$ is applied to the modified angular speed sequence, to obtain a windowed angular speed sequence, $\omega'(\theta_n)$, such that $$\omega'(\theta_n)=\omega'(\theta_n)w(\theta_n)$$

where $w(\theta_n)$ is a window function choice. The choice of window function is done using well known digital signal processing criteria, and with respect to the window giving optimum performance at misfire detection. Many choices for window functions are available including Hamming, Hanning, triangular, etc.

The frequency domain transformation of the window function is then computed, for example:

$$\neq'(\lambda)=f[\omega'(\theta_n)]=DFT[\omega'(\theta_n)] \text{ at } \lambda=\lambda_f$$

and the M-dimensional torque nonuniformity vector is then computed as described above.

Still another improvement in the frequency domain method is possible by obtaining a sampled engine angular velocity signal with the average engine angular velocity removed:

$$\omega''(\theta_n)=\omega_{sc}^2(\theta_n).$$

Then as described above, this input data is windowed, yielding:

$$\omega''(\theta_n)=\omega''(\theta_n)w(\theta_n).$$

Misfire Detection

If the torque produced by the engine during a given cycle were absolutely uniform, then n would be a M-dimensional null vector. In reality D is never a null vector owing to cyclic variability of combustion and to misfire, if present. A metric n is computed for representing torque nonuniformity and for detecting misfire, which is called the torque nonuniformity index or metric. This metric is computed by evaluating the norm of a vector which indicates the deviation from ideal engine performance caused by any nonuniformity in the generation of torque.

Any $L_p$ norm is adequate for the purpose of detecting the presence of a misfire; the two most common choices are:

$$n = \|n\|^1 \quad L_1 \text{ norm}$$
$$n = \|n\|^2 \quad L_2 \text{ norm}$$

Although either norm of will suffice for misfire detection, the $L_1$ norm is normally preferred because it is more efficiently computed (it does not require square and square-root operations and can be computed in integer arithmetic format, facilitating the onboard computation and misfire detection).

Figure 8:
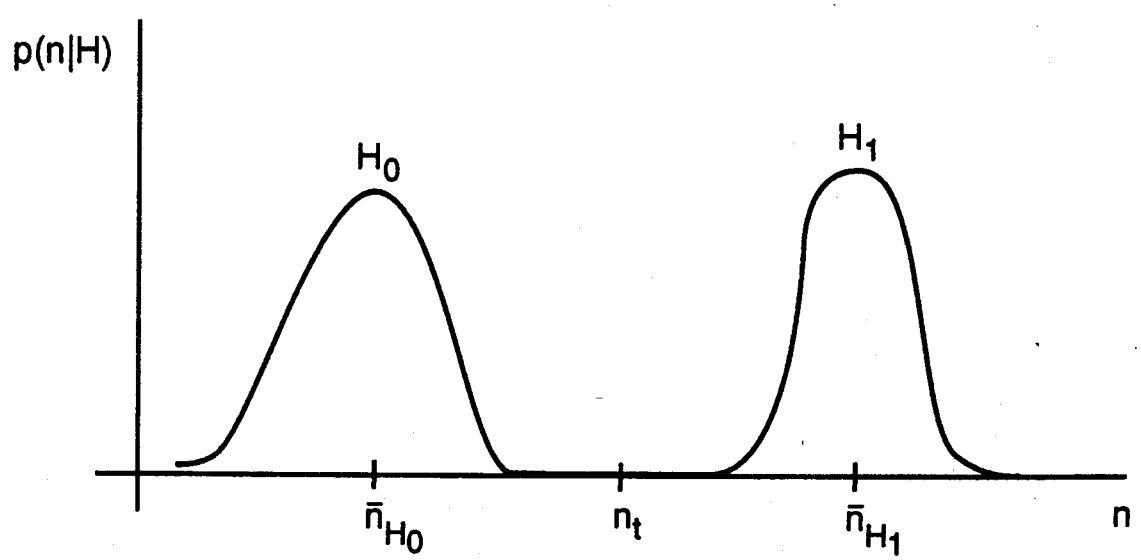
FIG. 8 is a graph of the probability density function for the random variable N under normal engine operation and misfire in one cylinder.

Detection of misfire is done on a statistical hypothesis testing basis. FIG. 8 is a graph of the probability density function for the random variable n under the two hypotheses.

$H_0$: normal engine operation

H₁: misfire in one cylinder (not necessarily the same for each cycle).

The left distribution in FIG. 8 represents the statistics of the random fluctuations in random variable n for normal engine operation. This distribution results from normal cyclic variability in combustion. The distribution on the right corresponds to the statistics in the event of one misfire in each engine cycle. The distribution is the same regardless of which cylinder misfires. The cylinder number of the single misfiring can be randomly changing from cycle to cycle.

The detection of misfire can be based on a variety of criteria according to statistical decision theory. One particularly simple test can be applied to the nonuniformity index n for each engine cycle by selecting a threshold $n_t$ midway between the mean values $\bar{n}_{H0}$ for normal operation and $\bar{n}_{H1}$ or misfire.

i.e., $n_t = \dfrac{n_{H1} + n_{H0}}{2}$

This particular choice of thresholds corresponds to assigning equal costs to false alarms and missed detections.

The following criterion for misfire detection is applied in the present embodiment.

n > $n_t$ → misfire n < $n_t$ normal operation.

There are two types of errors made by such a method:
1. n < $n_t$ for a misfiring cycle
2. n > $n_t$ for a normal cycle.

The probability for such errors is:

$$\rho_e = \int_{n_t}^{\infty} \rho_{H0}(n)dn + \int_{0}^{n_t} \rho_{H1}(n)dn$$

From actual experimental data, the error rate for a typical engine is less than 0.5%. The confidence level for errors at this rate is greater than 99%.

The computation of the nonuniformity metric described above is utilized to detect to occurrence of a misfiring condition. Once such a condition is detected, the problem becomes that of isolating the faulty cylinder(s).

Each misfire pattern is characterized by a specific vector $n^k$, where the index k correspond to the type of misfiring pattern. For example, k=0 might correspond to the condition "no misfire", k=1 to "misfire in cylinder No. 1", k=3,1 to "misfire in cylinders 3 and 1". Thus, each misfire condition is characterized by a unique vector signature. FIGS. 5A through 5D illustrate a few typical misfiring signatures or waveforms for single and double cylinder misfires in a V-6 engine where misfire occurs in cylinder(s) n; n, n+1; n, n+2; and n, n+3, respectively. The figures correspond to actual engine data. The algorithm described above converts the sampled velocity waveforms shown in FIGS. 5A through 5D into 2N-vectors of extrema.

Each of the vectors $n^k$ generates a point in 2N-dimensional euclidean space. As many points as misfire conditions can be represented in this space. The pattern recognition problem consists of determining which point the observed vector of extrema is closest to (based on a normal metric), given the known misfire pattern. The distance between the observation and each of the points in 2N space is represented by the shortest vector, according to the principle of orthogonal projections. Let this distance, δ, be defined as follows, in vector form:

$\delta^k = n^k - n$ where n is the observed vector of extrema corresponding to a specific engine cycle. Then the problem of isolating the misfiring cylinder is reduced to computing a norm of $\delta^k$ (any $L_p$ norm will suffice), and finding the minimum value: min{ $\| \delta^k \|$ }. This minimum indicates the "nearest neighbor", and therefore isolates the cylinder(s) which are the most probable cause of misfire. Experiments performed on production vehicles have verified that if this nearest neighbor classification is executed on the basis of a single cycle of engine velocity data, the correct classification is made with an error rate of three incorrect classifications in one thousand cycles. If the average of two consecutive cycles is computed, our experiments indicated zero errors over a sample space of 5,000 cycles.

The invention has been described in an illustrative manner and, it is to be understood that, the terminology which has been used is intended to be in the nature of words of description rather than of limitation.

Obviously, many modifications and variations of the present invention are possible in light of the above teachings. It is, therefore, to be understood that, within the scope of the appended claims, the invention may be practiced otherwise than as specifically described.

What is claimed is:

1. A method for detecting the misfire of a reciprocating internal combustion engine having a plurality of reciprocating components, at least one cylinder and a crankshaft, the method comprising the steps of:
   measuring the angular velocity of the crankshaft to obtain an electrical signal representation thereof, the electrical signal containing data;
   sampling the data synchronously with crankshaft angular position at a sampling rate to obtain sampled data;
   windowing the sampled data;
   filtering the data to minimize the effects of random error and disturbances in the electrical signal;
   calculating an M-dimensional torque nonuniformity vector derived from the windowed and filtered data, wherein the step of calculating includes the step of transforming the windowed and filtered data to a frequency domain equivalent; and
   applying a statistical decision algorithm to the torque nonuniformity vector, which algorithm statistically distinguishes between a true misfire and a normal cyclic variability which characterizes the combustion process in each cylinder of the engine, to thereby obtain a misfire signal.

2. A method for detecting the misfire of a reciprocating internal combustion engine having a plurality of reciprocating components, at least one cylinder and a crankshaft, the method comprising the steps of:
   measuring the angular velocity of the crankshaft to obtain an electrical signal representation thereof, the electrical signal containing data;
   sampling the data synchronously with crankshaft angular position at a sampling rate to obtain sampled data;
   windowing the sampled data;

filtering the data to minimize the effects of random error and disturbances in the electrical signal to obtain a filtered angular velocity signal;

calculating an M-dimensional torque nonuniformity vector derived from the windowed and filtered data, wherein the step of calculating includes the step of transforming the windowed and filtered data to be a frequency domain equivalent;

computing an index of torque nonuniformity based on the M-dimensional vector, the index of torque nonuniformity representing the variation in torque from cylinder to cylinder and from cycle to cycle; and applying a statistical decision algorithm to one of the torque nonuniformity vector and the index of torque nonuniformity, which algorithm statistically distinguishes between a true misfire and normal cyclic variability which characterizes the combustion process in each cylinder of the engine, to thereby obtain a misfire signal.

3. The method as claimed in claim 1 or claim 2 wherein the step of transforming includes the step of applying a discrete Fourier transform to the windowed and filtered data.

4. The method as claimed in claim 1 or claim 2 wherein the step of windowing includes the step of applying a Hanning window to the sampled data.

5. The method as claimed in claim 1 or claim 2 further comprising the step of removing the average angular velocity of the crankshaft from the measured angular velocity prior to the step of windowing.

6. The method as claimed in claim 1 or claim 2 further comprising the step of computing the torque due to combustion energy effectively exciting the crankshaft to thereby account for the torque attributable to the reciprocating forces.

7. A system for detecting the misfire of a reciprocating internal combustion engine having a plurality of reciprocating components, at least one cylinder and a crankshaft, the system comprising:

means for measuring the angular velocity of the crankshaft to obtain an electrical signal representation thereof, the electrical signal containing data;

means for sampling the data synchronously with the crankshaft angular position at a sampling rate to obtain sampled data;

means for windowing the sampled data;

means for filtering the data to minimize the effects of random error and disturbances in the electrical signal;

means for calculating an M-dimensional torque nonuniformity vector derived from the windowed and filtered data, wherein the means for calculating includes means for transforming the windowed and filtered data to a frequency domain equivalent; and means for applying a statistical decision algorithm to the torque nonuniformity vector, which algorithm statistically distinguishes between a true misfire and normal cyclic variability which characterizes the combustion process in each cylinder of the engine, to thereby obtain a misfire signal.

8. A system for detecting the misfire of a reciprocating internal combustion engine having a plurality of reciprocating components, at least one cylinder and a crankshaft, the system comprising:

means for measuring the angular velocity of the crankshaft to obtain an electrical signal representation thereof, the electrical signal containing data;

means for filtering the data to minimize the effects of random error and disturbances in the electrical signal;

means for sampling the data synchronously with crankshaft angular position at a sampling rate to obtain sampled data;

means for windowing the sampled data;

means for calculating an M-dimensional torque nonuniformity vector derived from the windowed and filtered data, wherein the means for calculating includes means for transforming the windowed and filtered data to a frequency domain equivalent;

means for computing an index of torque nonuniformity based on the M-dimensional vector, the index of torque nonuniformity representing the variation in torque from cylinder to cylinder and from cycle to cycle; and means for applying a statistical decision algorithm to one of the torque nonuniformity vector rand the index of torque nonuniformity, which algorithm statistically distinguishes between a true misfire and normal cyclic variability which characterized the combustion process in each cylinder of the engine, to thereby obtain a misfire signal.

9. The system of claim 7 or claim 8 further comprising means for removing the average angular velocity of the crankshaft from the measured angular velocity prior to the step of windowing.

10. The system as claimed in claim 7 or claim 8 further comprising computing means for computing the torque which is due to combustion energy effectively exciting the crankshaft to thereby account for the torque attributable to the reciprocating forces.

11. The system as claimed in claim 1 or claim 2 or claim 7 or claim 8 wherein the statistical decision algorithm includes a statistical pattern recognition algorithm.

12. The system as claimed in claim 7 or claim 8 wherein the means for transforming includes means for applying a discrete Fourier transform.

13. The system as claimed in claim 7 or claim 8 wherein the means for windowing includes means for applying a Hanning window.

14. The system as claimed in claim 7 or claim 8 wherein the means for filtering includes an analog filter.

* * * * *